United States Patent

[11] 3,631,255

[72] Inventors James R. Gender
Kirkwood;
Leonard V. Makela, Chesterfield; Karl Wolf, Webster Groves, all of Mo.
[21] Appl. No. 90,044
[22] Filed Nov. 16, 1970
[45] Patented Dec. 28, 1971
[73] Assignee Barry-Wehmiller Company
St. Louis, Mo.
Continuation of application Ser. No. 773,759, Nov. 6, 1968, now abandoned. This application Nov. 16, 1970, Ser. No. 90,044

[54] CONTAINER CROWN RING INSPECTION APPARATUS HAVING MEANS DISPOSED BETWEEN LAMPS AND CROWN RING FOR OBSTRUCTING RADIAL RAYS FROM LAMPS
5 Claims, 10 Drawing Figs.

[52] U.S. Cl. ........................................... 250/223 B, 209/111.7, 250/237, 356/240
[51] Int. Cl. ........................................... G01n 21/32, G06m 7/00, H01j 39/12

[50] Field of Search ........................................... 356/240, 237; 250/223 B, 217, 237; 209/111.7

[56] References Cited
UNITED STATES PATENTS

| | | | |
|---|---|---|---|
| 2,411,991 | 12/1946 | England et al. ............... | 356/237 |
| 3,191,773 | 6/1965 | Wyman ....................... | 209/111.7 |
| 3,302,787 | 2/1967 | Rottmann..................... | 250/223 B |
| 3,349,906 | 10/1967 | Calhoun et al................ | 250/223 B |
| 3,479,514 | 11/1969 | Kidwell ....................... | 356/240 X |

*Primary Examiner*—Archie R. Borchelt
*Assistant Examiner*—T. N. Grigsby
*Attorney*—Gravely, Lieder & Woodruff ABSTRACT: A crown ring defect inspection apparatus for beverage containers and the like comprising automatic inspection means for detecting crown ring chips and irregularities in a moving line of containers and rejecting the defective containers. The apparatus includes photoelectric means for examining each container as well as photomultiplier means responsive to optical signals for converting such signals to electrical signals which actuate the reject mechanism.

INVENTORS:
JAMES R. GENDER
LEONARD V. MAKELA
KARL WOLF
BY Gravely, Lieder & Woodruff
ATTORNEYS.

INVENTORS.
JAMES R. GENDER
LEONARD V. MAKELA
KARL WOLF

BY Gravely, Lieder & Woodruff
ATTORNEYS.

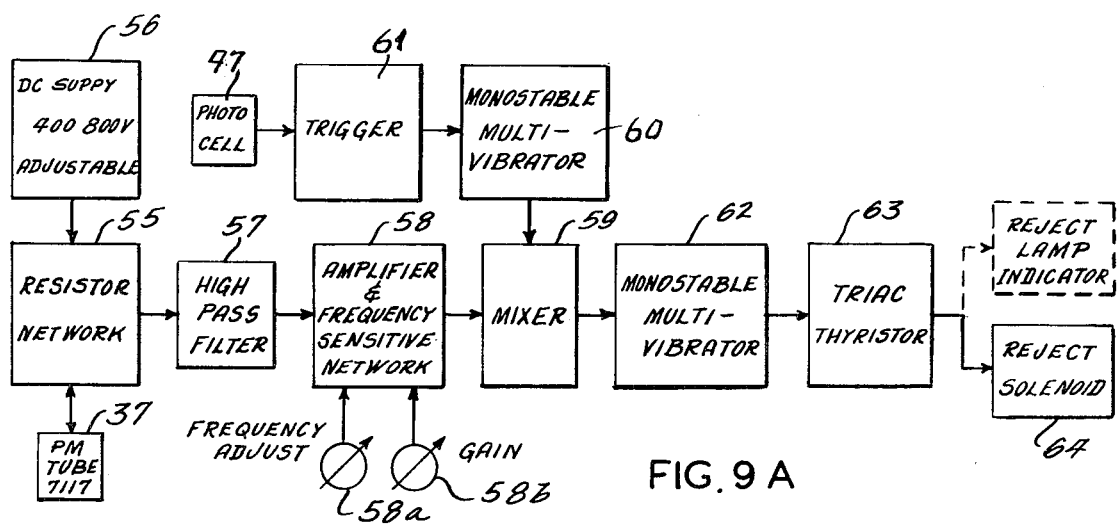
FIG. 9 A
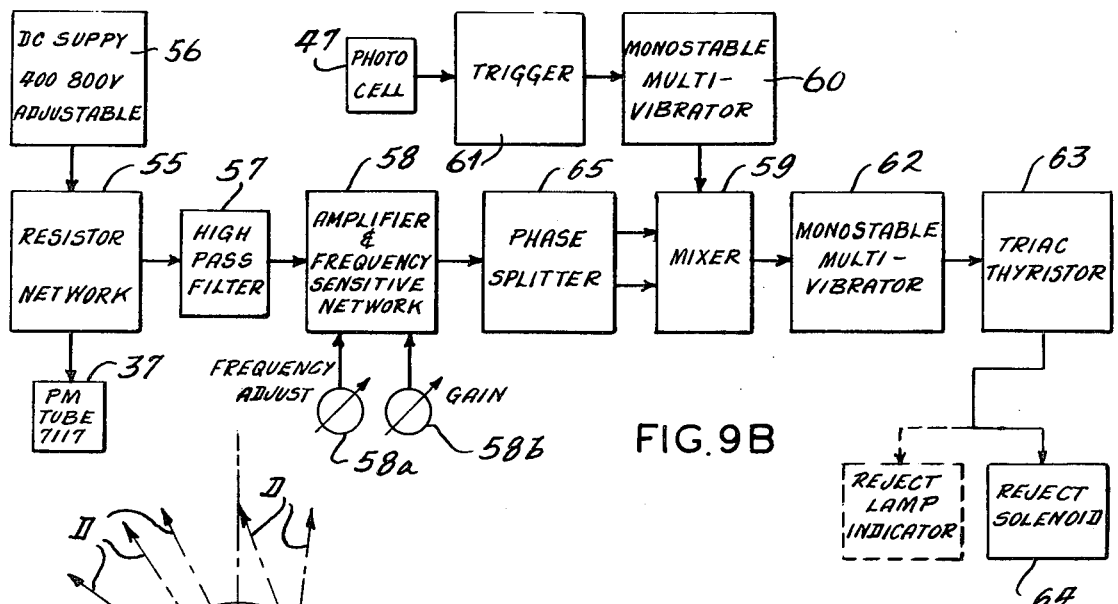
FIG. 9B
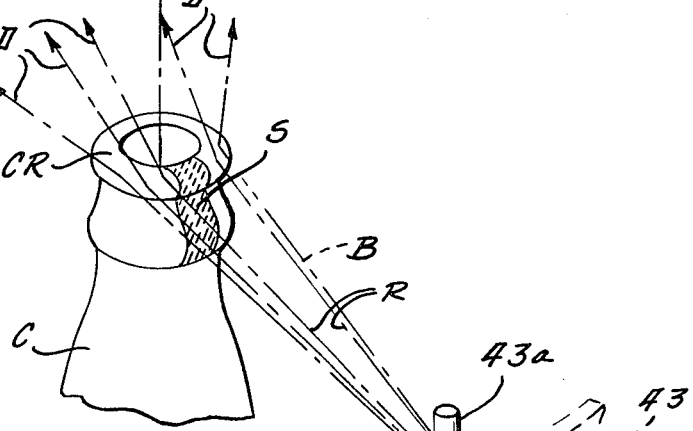
FIG. 6
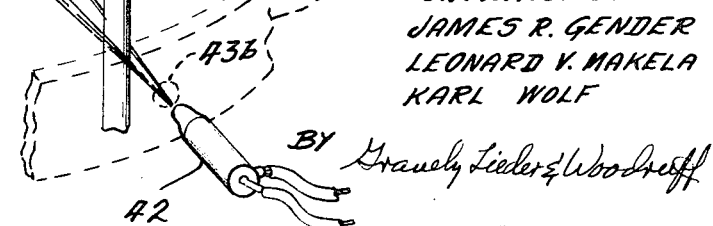
INVENTORS:
JAMES R. GENDER
LEONARD V. MAKELA
KARL WOLF
BY Gravely Lieder & Woodruff
ATTORNEYS.

INVENTORS:
JAMES R. GENDER
LEONARD V. MAKELA
KARL WOLF

BY Gravely Lieder & Woodruff
ATTORNEYS.

CONTAINER CROWN RING INSPECTION APPARATUS HAVING MEANS DISPOSED BETWEEN LAMPS AND CROWN RING FOR OBSTRUCTING RADIAL RAYS FROM LAMPS

This application is a continuation of application Ser. No. 773,759 filed Nov. 6, 1968 and now abandoned.

The invention relates to apparatus for detecting defects in container crown rings while moving in a high capacity conveyor system and for rejecting the defective containers before the latter are filled.

The crown ring portions of containers in one form of this invention may be inspected by optically projecting an image of the crown ring through a prism of rotating character onto a photomultiplier tube which converts defects in the optical image into electrical signals suitable for operating reject mechanism that withdraws the defective container from a line of moving containers. In an equivalent system the containers pass through an inspection station where the crown rings are illuminated by light from a predetermined source, and the illuminated image is viewed by a photomultiplier tube or by photocells which react to create a signal that is then used to initiate reject mechanism operation.

The objects of this invention are to detect or inspect for defective container crown rings while moving at high speed so as not to retard the capabilities of filling and capping equipment; to provide efficient and certain means for accomplishing the inspection function in a moving line containers; to provide simple and compact inspection apparatus that will avoid false signals; and to provide apparatus teat will accept containers without regard to color or size.

Other objects and advantages of the apparatus will be more particularly set forth in the following disclosure which is given in connection with the accompanying drawings, wherein;

FIG. 6 is a fragmentary and schematic view of the light deflecting action of one light source in the organization shown in FIG. 5;

FIG. 9A is a block diagram of an electronic circuit incorporating the signal producing means of the apparatus of FIG. 1; and FIG. 9B is a view similar to FIG. 9A but modified to suit the requirements of the apparatus of FIG. 8.

Figure 1:
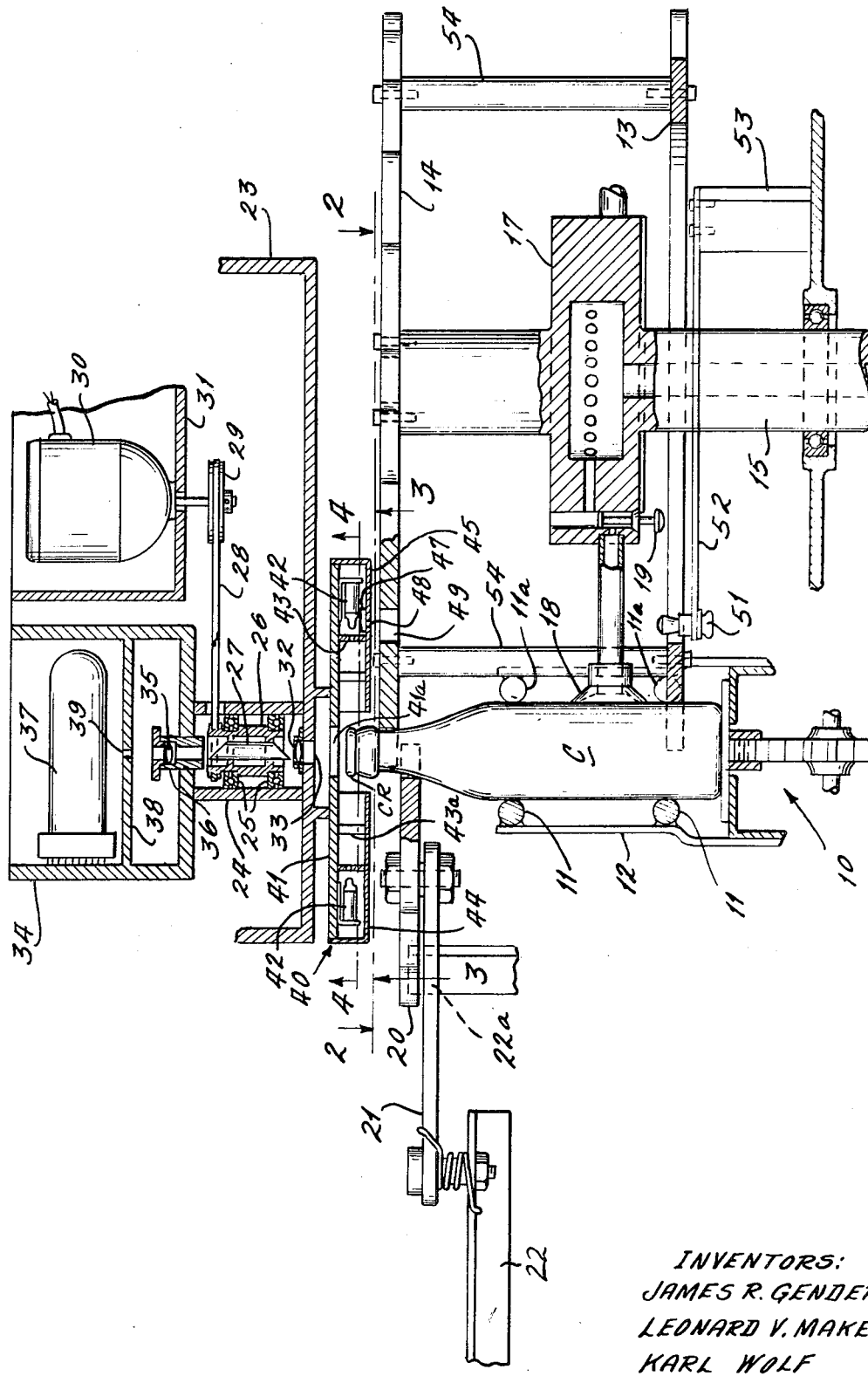
FIG. 1 is a sectional elevational view of a certain preferred embodiment of the invention showing the character and assembly of the various components.
Figure 2:
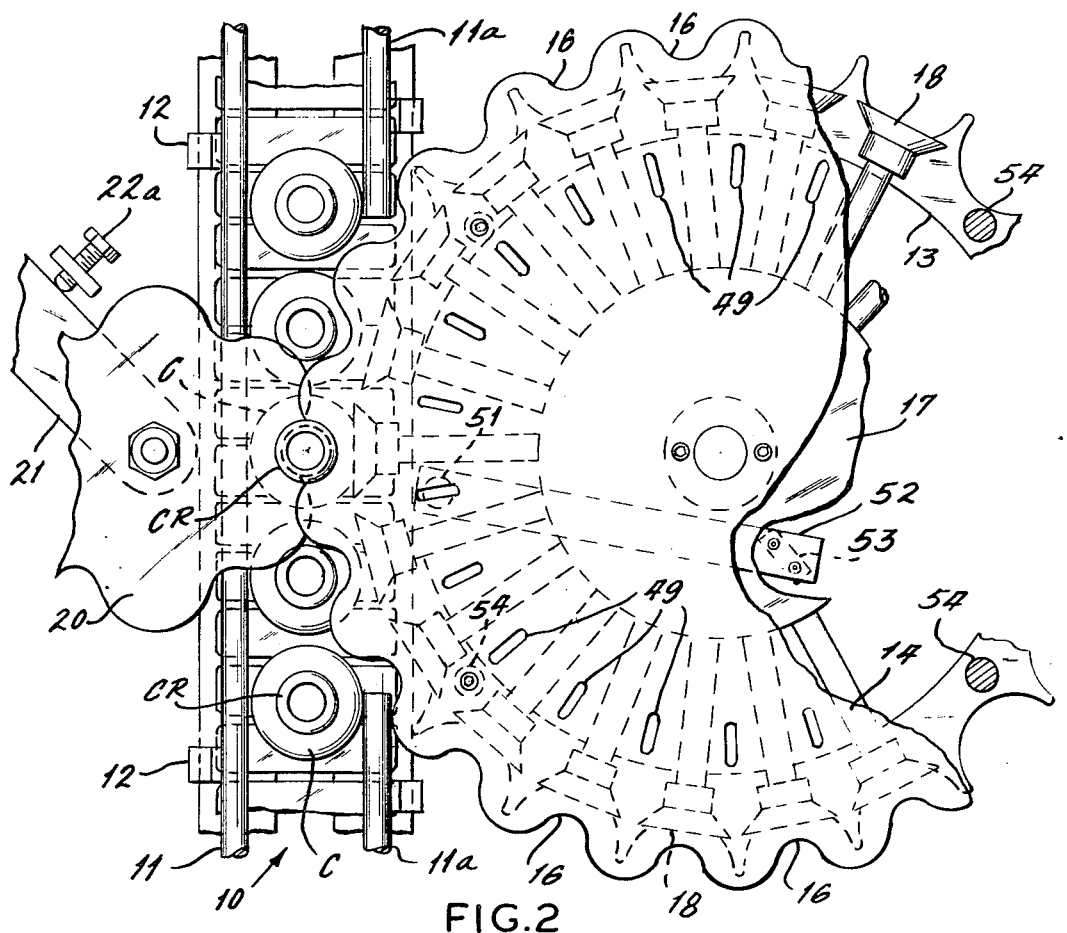
FIG. 2 is a fragmentary and enlarged view of the apparatus seen at line 2—2 in FIG. 1.

As is seen in FIGS. 1 and 2, the handling of the containers C is achieved by a flat chain type conveyor 10 of known construction having suitable guide rails 11 and 11a supported by brackets 12. The containers are moved on the conveyor 10 into and out of an inspection station defined by a pair of star wheels 13 and 14 mounted on a vertical shaft 15 for rotation in a horizontal plane. The star wheel 13 has a periphery formed with recesses to receive the bodies of a succession of containers, and the star wheel 14 has peripheral recesses 16 (FIG 2) to mesh with the neck portions of the containers. The shaft 15 carries a hub 17 which carries a plurality of suction cups 18 equal in number to the recesses in the star wheels 13 and 14. Each suction cup is controlled by a suitable valve mechanism 19 associated with vacuum means not shown but thoroughly set forth in Drennan U.S. Pat. No. 2,800,226, issued July 23, 1957. As each container C approaches the inspection station a meshing shield wheel 20 is engaged by the neck portion so that at the time of inspection of the container crown ring CR the container is fully shielded from ambient light such as light below the crown ring. The shield wheel 20 is rotatably mounted on a yieldable arm 21 carried by a suitable bracket 22 and spring pressed against an adjustable stop 22a (FIG. 2).

In the view of FIG. 1, the apparatus in the inspection station includes a stationary frame 23 which supports a housing 24 which carries suitable bearings 25 for a rotary tube 26 within which a Dove prism 27 is mounted. The tube 26 is rotated by a belt 28 driven from pulley 29 on the shaft of a motor 30 supported in a housing 31, the speed of rotation of the prism being approximately 8,800 r.p.m. The prism 27 is axially aligned with a collimating lens 32 mounted over an aperture 33 in the frame 23, and the upper end of the housing 24 carries an enclosure 34 in which a second collimating lens 35 is supported in a lens tube 36. The enclosure 34 carries a light energy receiver such as photomultiplier tube 37 separated from the lens tube 36 by a wall 38 in which an elongated aperture 39 is provided (see FIG. 5)

Figure 3:
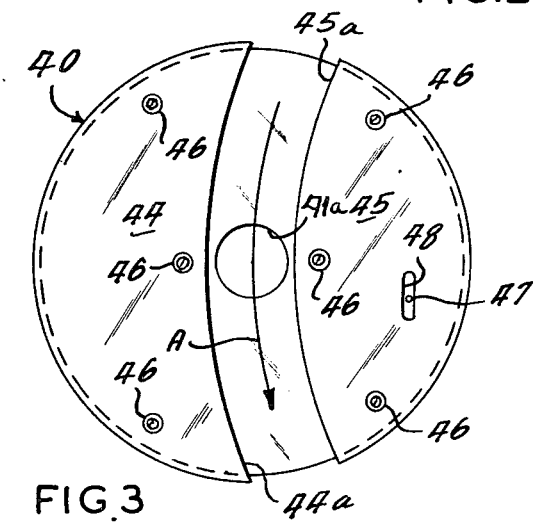
FIG. 3 is a view taken along line 3—3 in FIG. 1 looking upwardly at the lighting unit.
Figure 4:
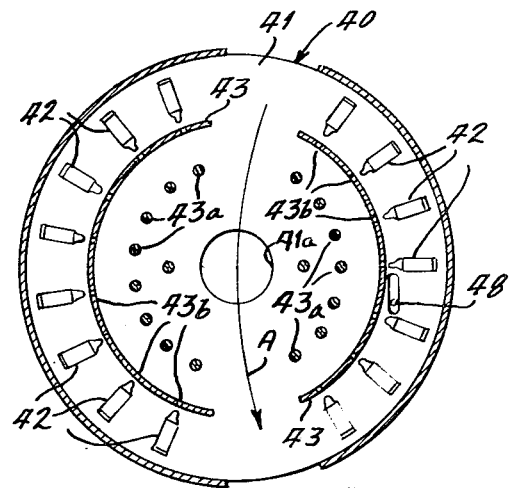
FIG. 4 is a sectional view taken at line 4—4 in FIG. 1 to shown certain interior details of the lighting unit.

Associated with the foregoing components is an illumination unit 40 which is mounted below t he frame 23 in the inspection station. The unit 40 includes a base 41 having a central aperture 41a and on which are mounted (FIG. 4) a plurality of light energy producing lamps 42. In this view each lamp is provided with a light projecting lens tip as an integral part. The lamps 42 are arranged in circumferentially spaced relation and are also divided into two groups on either side of the arcuate path of travel of the container crown rings, the path being indicated by the curved arrow A in FIGS. 3 and 4. The lamps 42 direct the light energy radially inwardly toward the center of the base where the container crown ring CR is inspected at aperture 41a. An important feature of the unit 40 is in the provision of light ray shield means 43 and blocking pins 43a radially inwardly of the shield for each lamp 42. The lamps 42 being located behind the curved light shield 43 which has apertures 43b for light rays to pass through (see FIG. 4) Light rays emanating from the sides of the lamps will be prevented from reaching the crown ring zone. The lamps 42 are enclosed by a pair of black-lined covers 44 and 45 spaced by arcuate margins 44a and 45a respectively to form a lane through which the container crown ring CR moves (FIG. 3). The covers are secured in position by screw posts 46. Thus, the lamps 42 are closed in to provide a black box effect.

The apparatus above described inspects each container crown ring CR while the container is in motion on the conveyor 10 by projecting a plurality of light beams form lamps 42 upon the crown ring. The light is reflected upwardly only by a light deflecting flaw and passes through the lens 32 where it is rotated by the action of the Dove prism 27 and is passed by the latter through the lens 35 toward the aperture 39 which is an elongated slit having a radial orientation relative to the crown ring CR. The radial slit directs a sector of light onto the photomultiplier tube 37 where it appears as a light "blip" and is converted into an electrical signal. A container free of crown ring flaws will not deflect light upwardly. As can be appreciated the light sources 42 are arranged in a circle in substantially the same plane with the crown ring CR and centered on the container axis in the inspection station. Each lamp 42 produces a divergent beam of light B (see FIGS. 5 and 6) having an effective rectangular cross section. Located in front of each lamp is the shield 43 to block stray light from adjacent lamps, and inwardly of the shield the blocking pin 43a obstructs the central portion of the beam.

Figure 5:
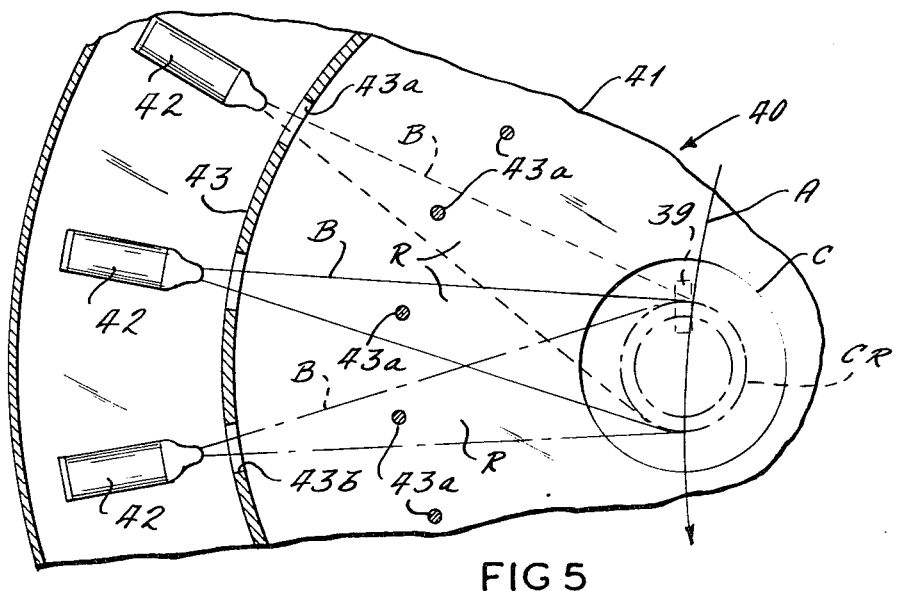
FIG. 5 is a greatly enlarged and fragmentary view of lighting means showing the manner in which it functions to illuminate a container crown ring.

Attention will now be directed to FIGS. 5 and 6 for a more detailed explanation of the operation of the unit 40, and in the view of FIG. 5 the slit 39 adjacent the photomultiplier tube 37 is superimposed in phantom outline. Each light B diverges toward the crown ring CR, but the central radial portion R is blocked so the portions on each side strike the crown ring at angles approaching the tangent. The angled light is deflected off in various directions D, none of which is directed upwardly in the axis of the container C. As a result a shadow S is created by each blocking pin 43a, but the two adjacent lamps will illuminate the shadow area without producing an axial deflection. It is also to be understood that the action of the Dove prism 27 is to see the entire image of the crown ring CR and to rotate that image two complete revolutions for each revolution of the prism. Thus, for a rotary speed of 8,800 r.p.m. the effective speed of rotation of the image is 17,600 r.p.m.

When a nondefective container crown ring CR is in the inspection station (FIGS. 4 and 5) all of the light beams are reflected by the surfaces and are bounced off in directions D (FIG. 6) nonparallel to the vertical axis of the container or Dove prism 27. These beams are not seen by the photomultiplier tube 37, either collectively or individually, because the blocking pins 43a obstruct the direct radial portions R of each beam B (FIG. 5) which would be reflected axially upwardly to the photomultiplier tube 37. Thus, each pin 43a casts a shadow S on the crown ring CR, but as before noted, each adjacent lamp delivers a portion of its beam on each side so that the beams overlap laterally behind the pins (on the crown ring side) to illuminate the crown ring around its complete circumference without having any portion reflected axially upwardly. As a result, the photomultiplier tube 37 sees darkness as long as the crown ring CR is not defective. When, however, a flaw is present the light deflected from the flaw is changed in direction and a beam directed axially upwardly results and this portion of the deflected light is picked up in the prism 27 and passed to the photomultiplier tube 37 as a sector of the crown ring CR.

In order to minimize background and ambient light that might cause false signals, the top surfaces of the star wheel 14 and the shield wheel 20 are black finished for maximum light absorption, the wheel 20 being provided to block out the photomultiplier tube field of view of the conveyor and approaching and receding containers. Proper meshing of the wheel 20 is provided by the spring tension on the arm 21 which allows swinging to adjust the mesh.

The spring keeps arm 21 forced against the adjustable stop 22a which limits arm travel. The stop is adjusted such that the shield star wheel 20 is in proper position for meshing. If meshing fails to occur, the arm 21 pivots backward to prevent jamming of containers. As soon as meshing can resume, the spring forces the shield star wheel 20 into meshing position via the arm 21 and the adjustable stop 22a.

Returning now to FIGS. 1 and 2 it can be seen that the illumination unit 40 carries inwardly of cover 45 a photocell 47 which is adjustably positioned relative to and aligned with an elongated aperture 48 in cover 45. The photocell receives a signal light beam through slots 49 in the star wheel 14. The source of the signal beam is the lamp 51 carried on a support arm 52 attached to a bracket 53. The photocell 47 can be shifted relative to slot 48 for adjustment of the timing of registration of the container crown ring CR at the inspection station. Pivoting of bracket 53 permits alignment of lamp 51 under the slots 49 for the photocell 47. As can be seen in FIGS. 1 and 2, the star wheel 13 is a ring suspended from star wheel 14 by hanger rods 54 suitably located between the suction tubes for the cups 18. The star wheels 13 and 14 are thus coupled together by the rods 54 for rotary movement together when engaged by the containers impelled by the conveyor 10. The number of slots is equal to the number of container recesses 16 so that as each recess is about to reach the inspection station the photocell 47 will generate a signal for a purpose to appear.

A block diagram of the electrical circuit for the inspection apparatus of FIG. 1 is seen in FIG. 9A and reference is directed thereto. The photomultiplier tube 37 which converts the optical image signal from the Dove prism 27 to electrical signals may be an RCA 7117, and is connected in a standard circuit as recommended. The tube 37 is powered through a resistor network 55 by an adjustable high voltage power supply 56 of 400–800 v. The tube output is connected through a high pass network 57 to the first amplifier stage of an amplifier and frequency sensitive network 58. The high pass filter 57 is required to reduce unwanted signals, mainly those at 60 and 120 Hz. in the power supply and at approximately 300 Hz. caused by the Dove prism rotation speed.

The frequency adjust control 58a is part of an RC network between the first and second amplifier stages, and gives some control over the high frequency response of the amplifier. As the control is set lower the frequency response is reduced, and this reduces sensitivity to small container defects. The gain control 58b adjusts the output of the second amplifier stage, and is used to adjust overall system sensitivity. A suitable mixer 59 is connected to follow the frequency sensitive network 58.

A gating signal is produced by the photocell 47 (FIG. 1) which is a silicon photovoltaic cell and is timed to container position to trigger a monostable multivibrator 60 through a Schmidt trigger switch 61, and provides the timed pulse during which crown ring inspection takes place. The gating signal allows the mixer 59 to pass signals only during the interval when the crown ring CR is being scanned, and the position of the photocell 47 on the illumination unit 40 is adjustable, so that the optimum turn-on time can be selected. The monostable multivibrator 60 has an ON time of approximately 4 milliseconds, but any time greater than about 3.4 milliseconds is deemed satisfactory. The longer the ON time, the slower the conveyor 10 must be traveling in order that the crown ring remains in view during the scan time. About a 4 millisecond scan time has been found satisfactory for conveyor speeds of about 25 inches a second.

The circuit includes a coincidence gate which receives both the output signals from the amplifier 58 and from the gate pulse generator 60. When both signals are simultaneously received, a reject signal is sent to a reject monostable multivibrator 62 and then to the solenoid control circuit 63 which includes a Triac thyristor. The Triac thyristor controls the power sent to the reject solenoid 64 which is not shown in FIG. 1, but is part of the operating components of the suction system associated with the suction cups 18. Though not shown a suitable power supply is provided for the plurality of lamps 42 and for the gate lamp 51.

Figure 7:
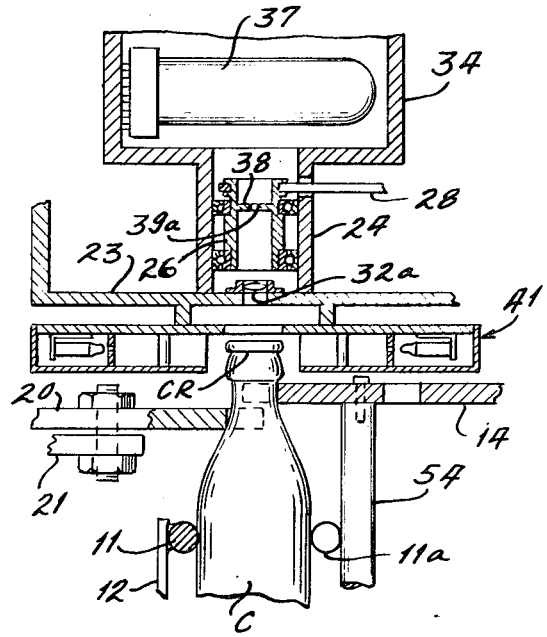
FIG. 7 is a fragmentary sectional elevational view of a modification of the apparatus seen in FIG. 1.

Turning now to FIG. 7, there is shown a modification of the apparatus of FIG. 1 in which the like parts are indicated by similar reference numerals. The difference in the apparatus of FIG. 7 to that in FIG. 1 resides in the simplification of the rotating means. In place of the rotating prism 27, the tube 26 now supports a mask 38a having the aperture or slit 39a therein. A focusing lens 32a is mounted axially above the station for the crown ring CR and focuses the illumination deflected by a flaw upon the aperture 39a. The light sensitive photomultiplier means 37 is, in this modified embodiment, still exposed to a light sector that rotates relative to it and to the crown ring because of the circular orbit imparted to the aperture or slit 39a. In other respects the apparatus of FIG. 7 functions in the same way heretofore described in connection with FIG. 1.

Figure 8:
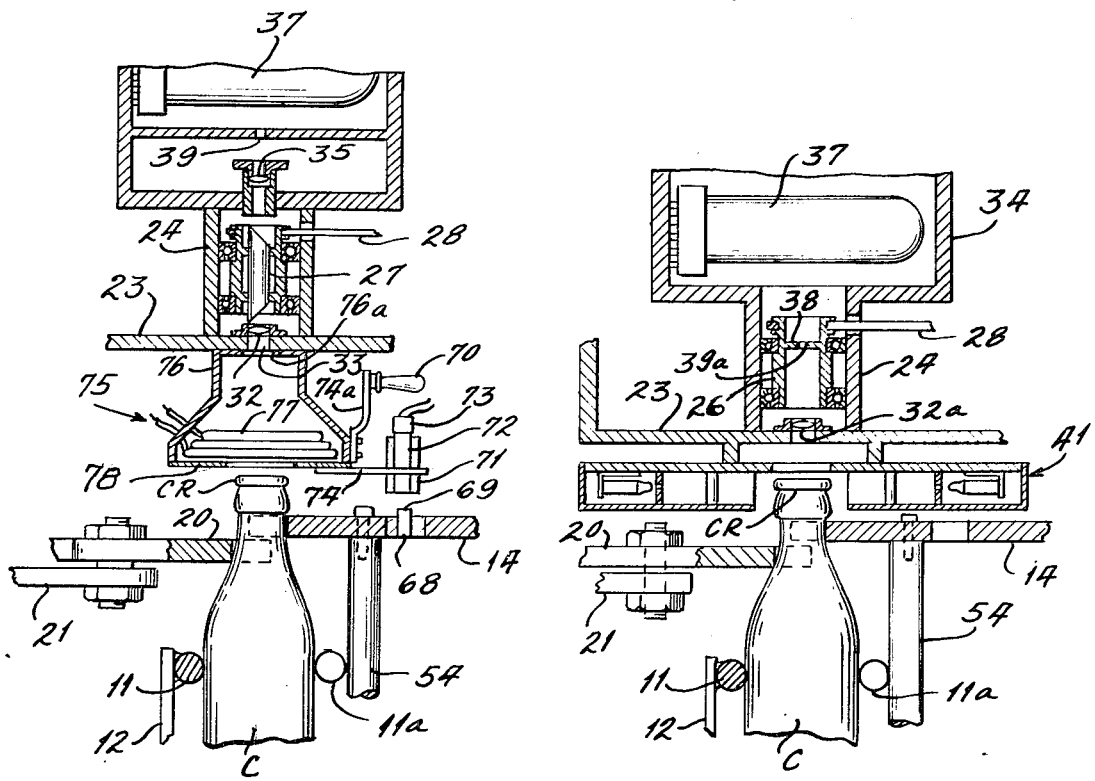
FIG. 8 is a view similar to FIG. 1 but showing a modification of the present invention.

In FIG. 8 a modified crown ring defect detector has been shown. Where possible parts and components like those shown in FIGS. 1 and 2 will be pointed out by like reference numerals, and only so much of the assembly will be described as is believed necessary to a full understanding of its operation. The containers C are conveyed as in FIG. 1 and engage star wheels, such as star wheel 14. The shield star wheel 20 is provided as before.

The means for obtaining a gating signal, includes in place of the slot 49 in star wheel 14 of FIG. 1, a plurality of pins 68 set in the star wheel. Each pin 68 has an upper polished end face 69 to reflect light conducted thereto from a lamp 70 through a clear plastic tube 71. The light reflected from the polished faces 69 is picked up in a clear plastic rod 72 carried in the tube 71 and directed to a photocell 73. The photocell 73 is mounted on the end of the rod 72 to collect all of the light from the lamp 70 which reaches the plastic rod 72. The tube 71 is carried by an arm 74 and the lamp 70 is supported by an arm 74a. The pins move with the star wheel 14 and sense the position of the containers relative to the inspection station.

Over the inspection station the frame 23 heretofore described carries the optical means in which a rotating Dove prism 27 and fixed collimating lenses 32 and 35 are included. The image of the crown ring CR is viewed through the slit 39 by the photomultiplier tube 37. In place of the illuminating unit 40, a modified unit 75 is mounted on the frame 23 over the aperture 33. This unit includes a suitable housing 76 having an upper aperture 76a and in which is mounted a cold cathode lamp 77 in a conical shape. The bottom of the housing 76 is provided with an apertured mask 78 which is positioned close to the crown ring. In a test apparatus the mask was set about one fourth inch above the crown ring and had an aperture of about one and three-fourths of an inch. The collimating lens 32 is desirably positioned at its focal length above the claimed is: ring, and the size of opening for this lens 32 is selected to control the amount of light entering the Dove prism 27 so that the collimated light rays are at a maximum usable level commensurate with the light required by the photomultiplier tube 37 to detect defects.

As before noted, the Dove prism is rotated by a belted motor and rotates at approximately 8,800 r.p.m. for optimum scanning. In this modification of FIG. 8 the upper lens 35 focuses the light rays from Dove prism in a sharp image at the slit 39, and the slit is located to one side of the crown ring image, as is indicated in phantom in FIG. 5. The dimensions of the slit 39 are selected so that at the highest speed of the conveyor 10, a half revolution of the Dove prism will give a complete scan of the crown ring CR without any part being missed due to conveyor movement and unwanted motions of the star wheel assembly.

In the modification, the light passing through the slit 39 is converted by the tube 37 to an electrical signal proportional to the overall light amplitude. The signal from tube 37 is the input to the electronic circuit system shown in FIG. 9B, the circuit being similar to the circuit described for FIG. 9A with the following differences. The cold cathode lamp 77 is excited with DC supply, since operation from the 60 Hz. power source gives 60 and 120 Hz. variations in light amplitude. In operation, the photomultiplier tube 37 sees a complete circle of light when there is no defect, but when a defect appears, the ring of light is intercepted and less light is transmitted. This decrease is sensed to produce the signal for energizing the reject solenoid 64. Some defects cause the ring to be locally enlarged thus increasing the amount of light transmitted. Thus, this requirement is met by inserted a phase splitter 65. Since crown ring defects can cause either dark or light spots, the signal caused by the defect can be a pulse in either positive or negative direction. Therefore, the phase splitter 65 follows the amplifier to give two outputs, one being inverted with respect to the other. In this manner, either type of defect signal gives a positive pulse to the mixer circuit 59. In the mixer 59 the phase splitter signals are combined so that either type of defect could trigger the reject monostable multivibrator 62.

The present invention has been set forth in certain preferred embodiments and each exhibits a stationary source of light energy directed toward the crown ring CR as each container is moved through the inspection station. The light energy receiving means 37 is also stationary relative to the crown ring and the light source 40 or 75 (as the case may be). The scanning function for each crown ring CR is accomplished by the rotating mask 38a or prism 27 in conjunction with the mask 38. The action of the prism is preferred as it gives a very high rate of scan while each container is in the inspection station for a short time. The prism also avoids the need to rotate the containers. The two examples 40 and 75 of illumination units will suggest the possible use of other equivalent energy producing means which is subject to modulation by crown ring defects and flaws and thereby deflected into the axis of the scanning means.

Therefore, changes and modifications thereof which do not represent departures from this disclosure are intended to be included within the scope of the appended claims.

What is claimed is:

1. Apparatus for inspecting container crown rings for light deflecting flaws comprising: means to continuously move containers along a known path in preparation for inspection of the crown ring; a stationary source of light adjacent the plane of the path of movement of the crown ring portion of containers, and said light source including a plurality of lamps and obstruction means disposed between each lamp and the crown ring to obstruct the radial portion of the light rays from illuminating the crown ring so that light on either side of radial rays is deflected by crowning flaws out of said plane in a direction substantially axially outwardly of the crown ring and during container movement making a flaw appear as a bright area relative to other areas of the crown ring; stationary light sensing means disposed axially opposite said predetermined place along the path of container movement; and means disposed axially outwardly of the crown ring and operative between said sensing means and the source of light to expose successive portions of the crown ring to said sensing means.

2. Apparatus for inspecting containers for light deflecting flaws in the crown ring comprising: a crown ring illuminating unit including a housing having a first opening adjacent which the container crown ring is disposed and a second opening axially spaced from said first opening, and lamp means in said housing arranged in spaced array around the interior to direct a beam of light radially upon the crown ring adjacent said first housing opening to illuminate substantially the entire circumferential extent of the crown ring; beam blocking means for each lamp set axially between a lamp and the approximate center of the crown ring, whereby the light beams from each said lamp are effective to illuminate portions of the crown ring at either side of the axial beam path; illumination sensing means positioned axially beyond said second opening so as to be spaced from the crown ring; means disposed between said second opening and said sensing means to project an image of the illuminated crown ring toward said sensing means, said image projecting means including a rotating prism which rotates the illuminated crown ring image; and a mask intercepting the illuminated crown ring image projected toward said sensing means, said mask having a slit therein to pass only a sector at a time of the illuminated image, whereby said sensing means scans the image sector and said rotating prism rotates successive sectors of the illuminated image past said slit.

3. The apparatus of claim 2 and including means to engage each container positioned adjacent said first housing opening and form a shield against ambient light entering said first opening.

4. The apparatus of claim 1 wherein said last means includes a Dove prism rotatable in the axis of the outwardly directed light, and a stationary mask having a slot therein directed radially of a segment o the entire crown ring.

5. Apparatus for inspecting container crown rings for flaws which deflect light in a direction axially of the container comprising: a crown ring illuminating unit having discrete sources of light surrounding a predetermined zone; light obstructing means for each discrete light source positioned to obstruct the radially directed portion of the rays of light directed toward each container crown ring moved through said predetermined zone; means at one side of said zone and engaged by successive containers for shielding the light from dilution by ambient light; means to move containers past said illuminating unit in position with crown rings passing through said zone to be illuminated by said discrete sources of light; means at the side opposite said shield and axially beyond the crown ring to scan the zone for light directed out of said zone by the crown ring, said scan means including a photoelectric element responsive to light received thereby and rotating viewing means between said photoelectric element and said zone to expose successive sectors of said zone to said element, whereby light directed from a crown ring flaw is passed to said photoelectric element.

* * * * *

UNITED STATES PATENT OFFICE
CERTIFICATE OF CORRECTION

Patent No. 3,631,255     Dated ~~December 28, 1971~~

Inventor(s) James R. Gender and Leonard V. Makela

It is certified that error appears in the above-identified patent and that said Letters Patent are hereby corrected as shown below:

Col. 2, line 48, after "beams" and before "lamps", cancel "form" and substitute -- "form";

Col. 5, line 15, at the beginning of the line, after "the", cancel "claimed is" and substitute -- "crown";

Col. 6, line 11, after "by" and before "flaws", cancel "crowning" and substitute -- "crown ring";

Signed and sealed this 18th day of July 1972.

(SEAL)
Attest:

EDWARD M. FLETCHER, JR.
Attesting Officer

ROBERT GOTTSCHALK
Commissioner of Patents